United States Patent [19]
Hurlburt

[11] Patent Number: 4,605,259
[45] Date of Patent: Aug. 12, 1986

[54] OPERATOR'S CAB FOR CROP HARVESTING MACHINE

[75] Inventor: Joseph C. Hurlburt, Lancaster, Pa.

[73] Assignee: New Holland Inc., New Holland, Pa.

[21] Appl. No.: 723,425

[22] Filed: Apr. 15, 1985

[51] Int. Cl.⁴ .............................................. B60J 1/02
[52] U.S. Cl. ..................................... 296/190; 296/200
[58] Field of Search ................ 296/190, 200, 201, 202

[56] References Cited

U.S. PATENT DOCUMENTS

| | | | |
|---|---|---|---|
| 2,061,788 | 11/1936 | Wright | 296/200 |
| 3,802,530 | 4/1974 | Purcell et al. | 296/190 |
| 3,998,489 | 12/1976 | Blakeslee | 296/190 |
| 4,416,486 | 11/1983 | McNaught et al. | 296/190 |

*Primary Examiner*—Robert R. Song
*Attorney, Agent, or Firm*—Larry W. Miller; Frank A. Seemar; Darrell F. Marquette

[57] ABSTRACT

An operator's cab for a self-propelled crop harvesting machine is disclosed wherein the generally vertical support post extending between the floor member and the roof member are oriented with the line of vision of an operator positioned within the operator's station. The width of each support post extending perpendicular to the line of sight of the operator is less than the eye spacing of the operator to permit full vision of the harvesting operation at a reasonable distance outside the cab. Glazing elements are positioned behind the support posts so that they do not detract from the operator's field of vision. A glazing extrusion is also disclosed wherein adjacent glass panels are supported by the corresponding support posts and positionally fixed relative thereto without the provision of any portion of the support posts extending between the glass panels.

11 Claims, 6 Drawing Figures

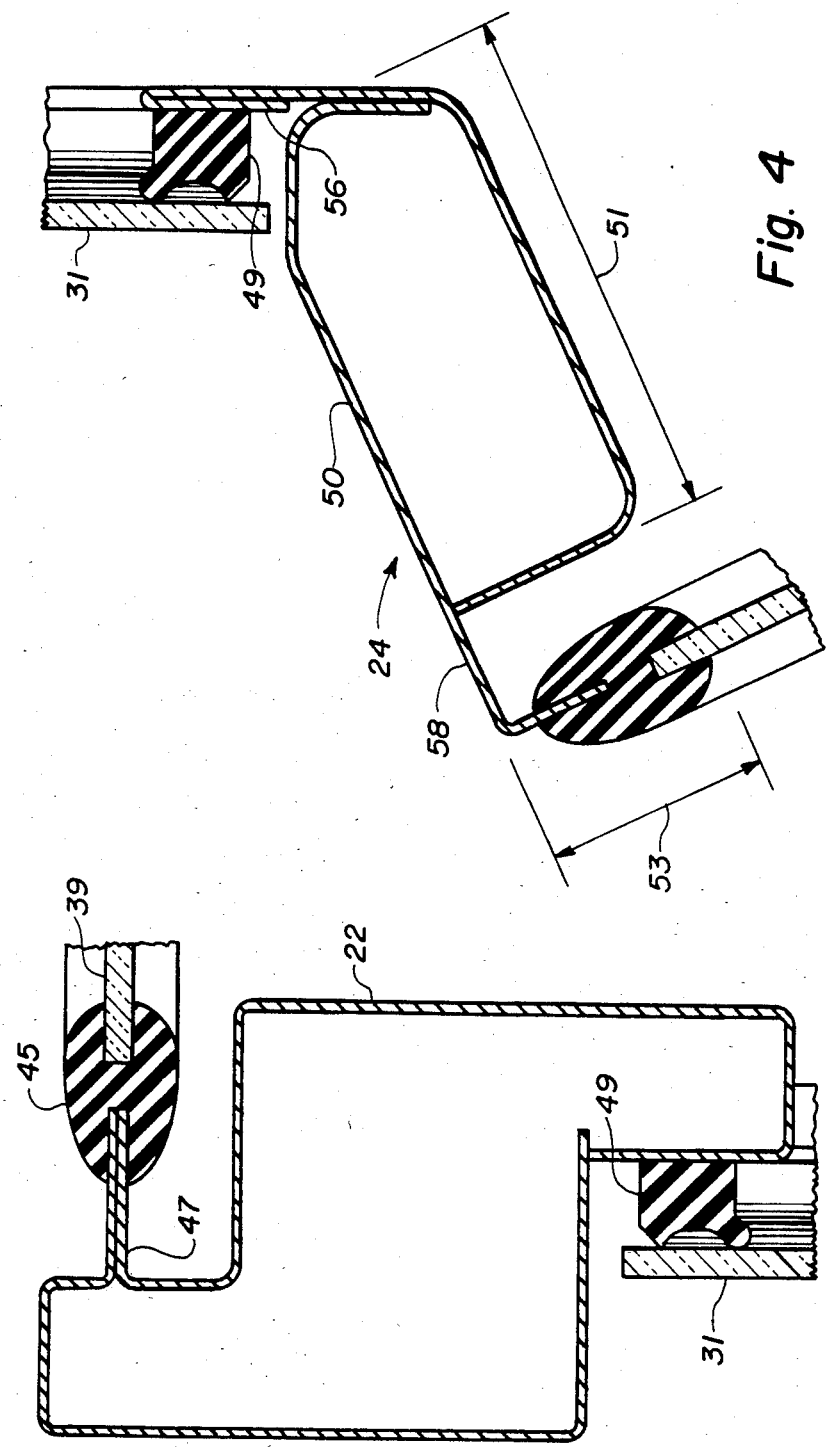

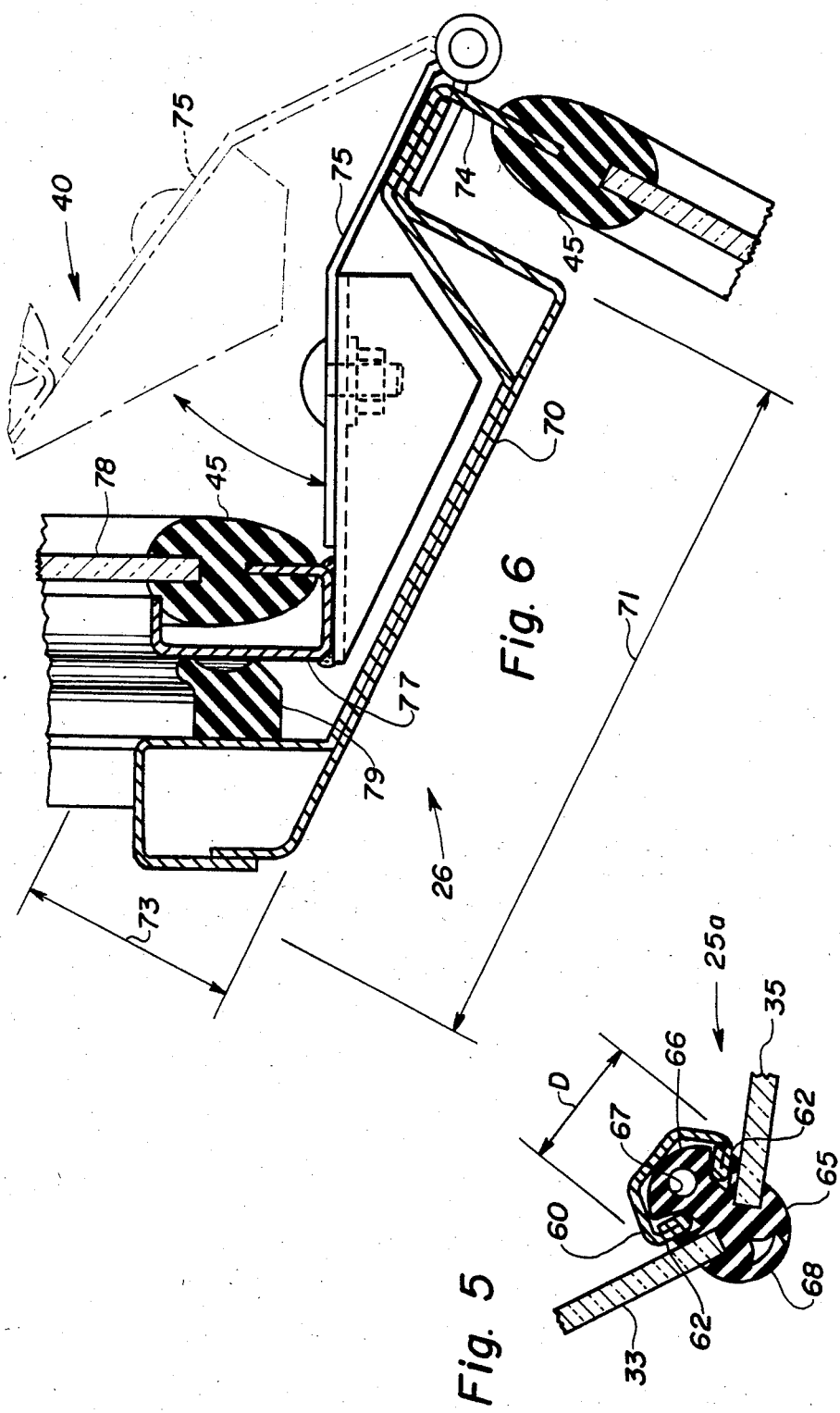

OPERATOR'S CAB FOR CROP HARVESTING MACHINE

BACKGROUND OF THE INVENTION

The present invention relates generally to self-propelled crop harvesting machines, such as combines, and, more particularly, to improvements in construction of the operator's cab to maximize the operator's vision of the crop harvesting operation.

Modern self-propelled crop harvesting machines are generally equipped with an enclosed operator's cab in which the operator is seated to control the harvesting operation of his machine. Such operator's cabs are generally provided with environmental controls, such as air conditioning and sound absorbing materials, to improve the quality of the work environment for the operator. Operator cabs are generally mounted at an elevated position on the crop harvesting machine to afford the operator a field of view of the harvesting operation relating to the gathering of crop material from the field in which he is operating. To permit this field of view, the cab enclosure is provided with a number of transparent panels, normally glass, supported from vertical posts extending between the floor member and the roof member of the cab.

Typically, the glass panels are supported from rubber glazing elements that encircle each panel of glass. Each glazing element is supported from one of the vertical posts or other portions of the cab housing to completely encircle the perimeter of the glazing elements. As a result, each joint between adjacent glass panels is provided with two glazing elements plus a structural element of the cab separating and supporting the adjacent glazing elements. While this approach offers easy assembly and serviceability, a great amount of visual obstruction is encountered. Accordingly, it would be desirable to provide an operator's cab for a self-propelled crop harvesting machine that provides glass support having minimal visual obstruction without loss of structural strength of the structural elements.

SUMMARY OF THE INVENTION

It is an object of this invention to overcome the aforementioned disadvantages of the prior art by providing an operator's cab construction to maximize the field of vision while maintaining structural integrity.

It is another object of this invention to provide an operator's cab having generally vertically extending support posts oriented with the line of sight from the operator's station to minimize visual obstruction.

It is still another object of this invention to provide support posts for an operator's cab in which the obstructing dimension is less than the eye spacing of the operator positioned within the operator's station.

It is yet another object of this invention to provide glazing elements for support of glass panel that do not detract from the operator's field of vision.

It is a feature of this invention that generally vertical support posts can be utilized for the passage of wiring and hoses between the roof and floor members.

It is an advantage of this invention that firm support for the glass panels is provided without stress points.

It is another advantage of this invention that installation and removal of glass panels can be easily accomplished.

It is another feature of this invention that full vision of the crop harvesting operation involving the gathering of crop material from the field can be attained at a reasonable distance outside the operator's cab.

It is yet another feature of this invention that the glazing elements retain the position of adjacent glass panels without the need of structural elements being positioned therebetween.

It is yet a further object of this invention to provide a glazing extrusion having an attachment portion engageable with the corresponding support post and a glass retention portion to permit the glazing element to be positioned behind the support posts and out of the field of vision of the operator.

It is still a further object of this inventin to provide a support post and glazing configuration for an operator's cab on a self-propelled crop harvesting machine that maximizes the operator's field of vision.

It is yet a further object of this invention to provide an operator's cab for a self-propelled crop harvesting machine which is durable in construction, inexpensive of manufacture, carefree of maintenance, facile in assemblage, and simple and effective in use.

These and other objects, features and advantages are accomplished according to the instant invention by providing an operator's cab for a self-propelled crop harvesting machine wherein the generally vertical support post extending between the floor member and the roof member are oriented with the line of vision of an operator positioned within the operator's station. The width of each support post extending perpendicular to the line of sight of the operator is less than the eye spacing of the operator to permit full vision of the harvesting operation at a reasonable distance outside the cab. Glazing elements are positioned behind the support posts so that they do not detract from the operator's field of vision. A glazing extrusion is also provided wherein adjacent glass panels are supported by the corresponding support posts and positionally fixed relative thereto without the provision of any portion of the support posts extending between the glass panels.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is an enlarged cross-sectional view of the right rear support post;

FIG. 4 is an enlarged cross-sectional view of the right side support post;

FIG. 5 is an enlarged cross-sectional view of the front support posts and the corresponding glazing element extrusion; and FIG. 6 is an enlarged cross-sectional view of the left side support posts supporting the hinge axis for the axis door into the operator's cab, the movement of the axis door being shown in phantom.

DETAILED DESCRIPTION OF THE PREFERRED EMBODIMENT

Figure 1:
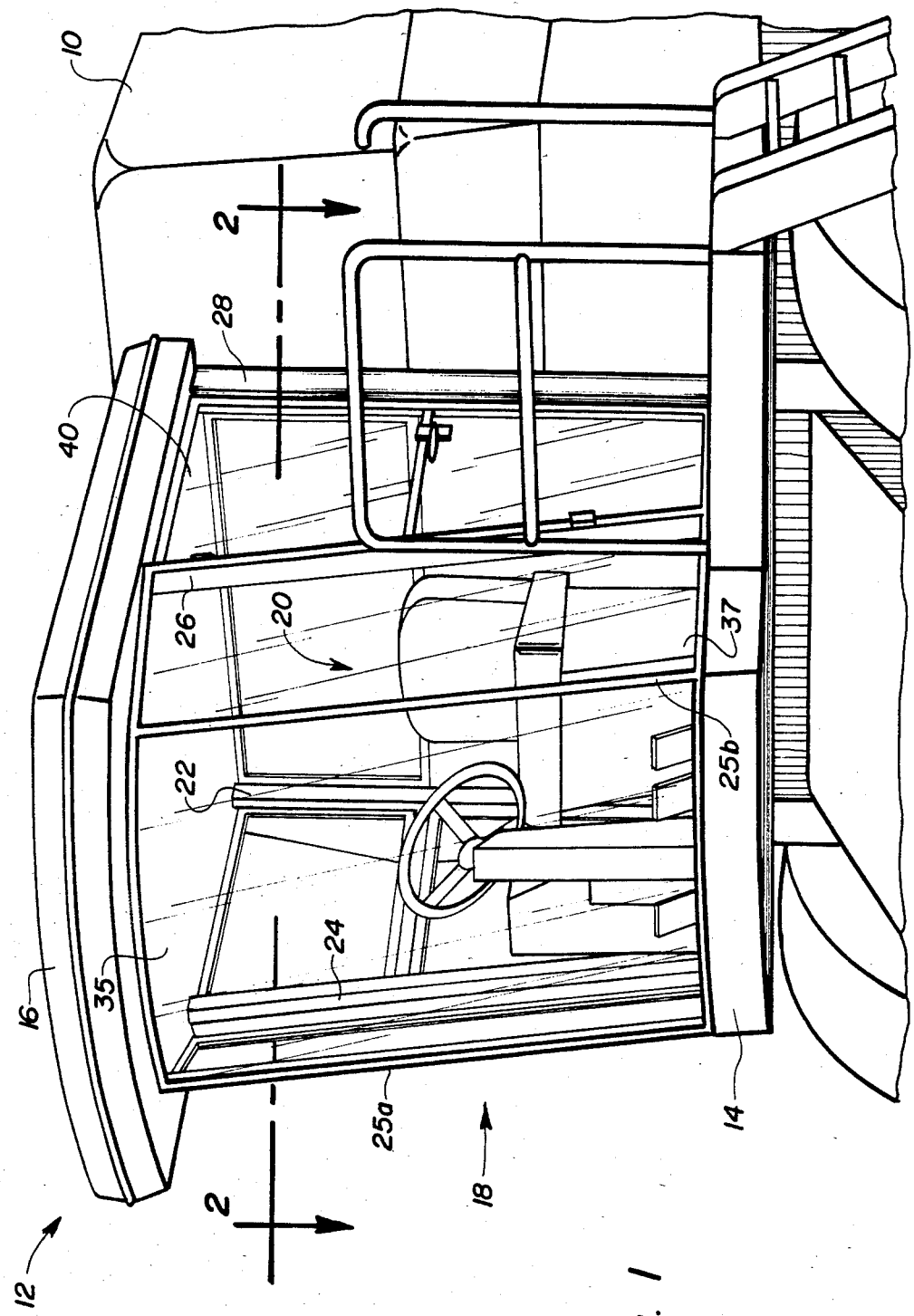
FIG. 1 is a perspective view of an operator's cab forming a part of a self-propelled crop harvesting machine and incorporating the principles of the instant invention.

Referring now to the drawings and, particularly, to FIG. 1, a perspective view of the operator's cab mounted on a self-propelled crop harvesting machine, commonly referred to as a combine, can be seen. Any left and right references are used as a matter of convenience and are determined by standing at the rear of the machine, facing the forward end, the direction of travel. The self-propelled crop harvesting machine 10 is fragmentarily shown and represents a conventional combine harvester; however, one skilled in the art will readily realize that the principles of the instant invention will not be limited to the type of harvesting machine on which the operator's cab is mounted.

Figure 2:
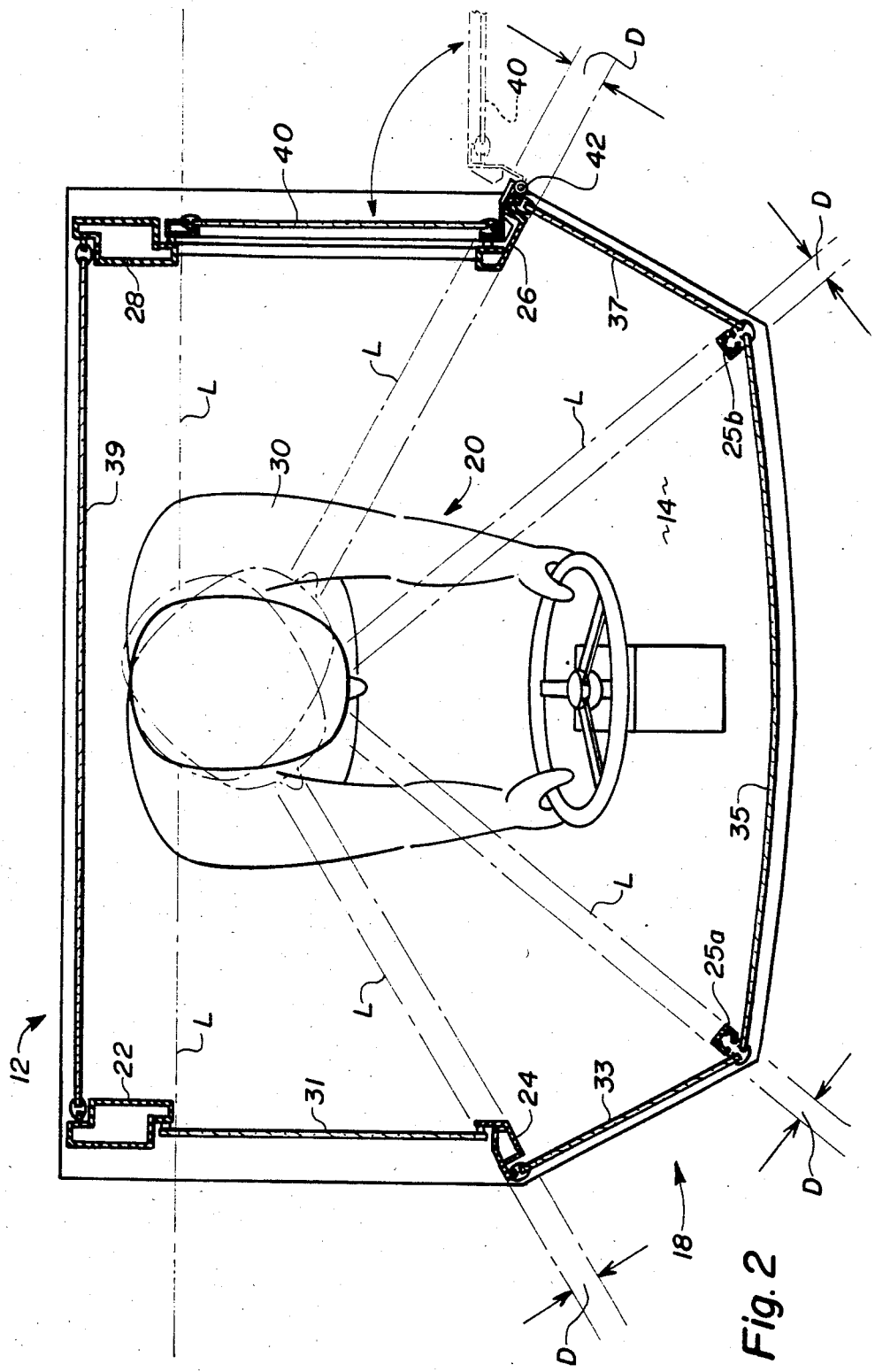
FIG. 2 is a cross-sectional view of the operator's cab corresponding to lines 2—2 of FIG. 1 to represent the field of vision of the operator.

Referring to FIGS. 1 and 2, the structural details of the operator's cab 12 can best be seen. The cab 12 includes a floor member 14, a roof member 16 vertically spaced above the floor member 14 and an enclosure 18 extending around and encompassing an operator's station 20, shown in the form of a seat, steering wheel, etc. Supporting the roof member 16 above the floor member 14 and at least partially supporting the enclosure 18, the operator's cab 12 is provided with a plurality of support posts; namely, a right rear support post 22, a right side post 24, two front support posts 25, a left side post 26 and a left rear support post 28, spaced around the periphery of the enclosure 18.

As best seen in FIG. 2, the operator 30 positioned at the operator's station 20 is provided with a field of vision extending radially from the right rear support post 22 to the left rear support post 28. To permit the operator 30 to observe the crop harvesting operation conventionally occurring in front of him, the enclosure 18 includes a right side window 31 supported between the right rear support post 22 and the right side post 24, a right side transparent panel 33 (typically glass) supported between the right side post 24 and the right front post 25a, a large curved front transparent panel 35 supported between the right front post 25a and the left front post 25b, a left side transparent panel 37 supported between the left front post 25b and the left side post 26, and a transparent access door 40 pivotally supported for movement about a hinge axis 42 mounted on the left side post 26 and closing against the left rear support post 28. Unlike the combine 10 depicted in FIG. 1, some crop harvesting machines will not have structural elements positioned immediately rearwardly of the operator's cab 12 and, accordingly, the enclosure 18 can optionally incorporate a rear window 39 supported between the right rear post 22 and the left rear post 28.

As best seen in FIG. 2, the support posts forwardly of the operator's station 20, namely, the right side post 24, the two front posts 25 and the left side post 26, are oriented to minimize the obstruction to the field of view of the operator 30. The obstructing dimension D, i.e., the dimension of the support posts perpendicular to the line of sight L of the operator 30, for each forward support post 24,25,26 is less than the eye spacing of the operator 30. As a result, the operator 30 will have full vision of the harvesting operation occurring in the field before him at a reasonable distance outside the cab enclosure 18. The glazing elements 45,65 supporting and retaining the respective transparent panels are located on the opposing side of the respective support posts from the operator's station 20 in such a manner that the glazing elements 45,65 are hidden behind the respective support posts and, thereby, do not further detract from the operator's field of vision.

Referring now to FIGS. 3-6, the structural details of the support posts can best be seen. FIG. 3 shows that the right rear support post 22 is constructed as a generally hollow boxlike member, permitting the passage of wiring, heater hoses, air conditioning hoses, etc. between the roof member 16 and the floor member 14. The oblong glazing element 45 supporting the rear window 39 is attached to a leg 47 formed in the support post 22. A seal 49 for the side window 31, which is hinged along its upper horizontal edge (not shown) to open outwardly, is affixed to the support post 22. As best seen in FIG. 2, the left rear support post 28 is constructed as a mirror image of the right rear support post 22 with the left rear post 28 having a seal for the closure of the access door 40 instead of the window 31. Both rear posts 22,28 are generally vertically oriented.

Referring now to the cross-sectional views of FIGS. 2 and 4, the right side support posts 24 can best be seen. As best seen in FIG. 1, the forward support posts 24,25,26 are inclined forwardly and/or outwardly with respect to a vertical line to locate the respective transparent panels 33,35,37 at an angle to reduce glare problems. The right side post 24 is formed into an oblong hollow beam 50 having a major dimension 51 greater than a minor dimension 53. As best seen in FIG. 2, the beam 50 is oriented such that the major dimension 51 is parallel to the line of sight L of the operator 30 and, therefore, the minor dimension 53 becomes the obstructing dimension D. The leg 56 of the post 24 supports a seal 49 for the side window 31. Another leg 58 permits attachment of the oblong glazing element 45 at a position behind the beam 50 to permit the support and retention of the right side transparent panel 33 without exposing the glazing element 45 to the line of sight L of the operator 30. As best seen in FIG. 4, the width of the oblong glazing element 45 is less than the minor dimension 53, permitting the glazing element 45 to be hidden entirely behind the post 24 and out of the field of vision of the operator 30. As with the rear support post 22,28, the hollow beam 50 can permit the passage of wiring, etc. between the floor member 14 and the roof member 16.

Referring now to FIGS. 2 and 5, the structural details of the front support posts 25 can best be seen. Each support post 25 is formed as a generally U-shaped channel 60 having inwardly directed legs 62. The obstructing dimension D is again smaller than the eye spacing of the operator 30 to permit a full view of the harvesting operation at a removable distance beyond the enclosure 18. A glazing extrusion 65 engages the channel member 60 and supports and retains adjacent glass panels 33,35. While FIG. 5 depicts the right front post 25a, the right front post 25a and the left front post 25b are constructed identically, except that the left front post 25b is provided with a glazing extrusion 65 that supports and retains adjacent transparent panels 35,37.

The glazing extrusion 65 is formed in two integral portions, an attachment portion 66 and a glass retention portion 68. The somewhat bulbous attachment portion 66 is adapted to be received within the channel member 60 and retained in position by the inwardly directed legs 62. To facilitate deformation of the attachment portion 66 for positioning within the channel members 60, a hole 67 extends axially through the attachment portion 66. Since the glazing extrusion 65 extends between the roof member 16 and floor member 14, the hole 67 in the attachment portion 66 could be utilized as a drain tube for air conditioning condensate or the like. The glass retention portion 68 projects outwardly from the channel member 60 and is adapted to receive and retain the edges of the adjacent glass panels 33,35 or 35,37, respectively. As best seen in FIG. 5, the glazing extrusion 65 supports the glass panels 33,35 from the support post 25a without the need of a structural member extending therebetween. Since the size of the glass retention portion 68 is smaller than the obstructing dimension D of the channel member 60, the glazing extrusion 65 can be hid out of the line of sight L of the operator 30 behind the channel member 60 as is best seen in FIG. 2.

Referring now to FIGS. 2 and 6, the structural details of the left side post 26 can be seen. The left side post 26 is formed as an elongated member 70 having a major dimension 71 greater than a minor dimension 73. As with the right side post 24, the elongated member 70 is oriented such that the major dimensions 71 is positioned parallel to the line of sight L of the operator 30 and, hence, the minor dimensions 73 becomes the obstructing dimension D. The left side post 26 is provided with a leg 74 to which is attached the oblong glazing element 45 for the support and retention of the left side panel 37. The access door 40 is pivotally supported by a hinge assembly 75 attached to the left side post 26 and defining the hinge axis 42. The door 40 is formed by a channel like frame 77 extending around the periphery of the door 40 and supporting a glazing element 45 for retaining a glass panel 78 to permit visibility through the door 40. A seal 79 is affixed to left side post 26 and to the left rear support post 28 to permit a sealing of the door 40 when in the closed position.

One skilled in the art will readily realize that an operator's cab constructed in the manner described above will provide a maximum field of vision for observing the harvesting operation relating to a gathering of crop material from the field without sacrificing structural strength and integrity. The forward support posts 24,25,26 can be inclined out of a vertical orientation to angle the glass panels 33,35,37 for functional improvement, as well as to provide an asthetically pleasing appearance. In addition to improved operator visibility, the instant invention provides enclosed passages for hoses and electrical wiring to improve the aesthetic appearance of the cab 12 from both the inside and the outside.

It will be understood that changes in the details, materials, steps and arrangement of parts which have been described and illustrated to explain the nature of the invention, will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In an operator's cab for a crop harvesting machine, said cab being mounted on said crop harvesting machine to provide a field of view of a portion of the harvesting operation involving the gathering of crop material from the field, said cab having a floor member; a roof member vertically spaced above said floor member; an operator's station supported on said floor member to position an operator during operation of said crop harvesting machine; a plurality of generally vertically extending support posts supporting said roof member above said floor member, a portion of said support posts being positioned forwardly of said operator's station within said field of view, each said forward support post having an obstructing dimension extending generally perpendicular to the line of sight from said operator's station; an enclosure at least partially supported by said support posts, extending between said floor member and said roof member and surrounding said operator's station, said enclosure including transparent panels extending between said forward support posts; and glazing elements supported by said forward support posts to engage and support said transparent panels, the improvement comprising:

each said glazing element having a dimension no greater than said obstructing dimension and being positioned on the opposing side of the corresponding said forward support post from said operator's station such that said glazing elements do not obstruct said field of view, at least one of said glazing elements being an elongated extrusion having an attachment portion engageable with the corresponding forward support post to effect attachment therewith and a panel retention portion engageable with the said corresponding transparent panels for support and retention thereof, said extrusion being constructed such that said corresponding transparent panels are positionally fixed without any portion of said corresponding forward support post being positioned therebetween.

2. The operator's cab of claim 1 wherein said attachment portion of said glazing extrusion has an opening extending axially therethrough to permit deformation of said attachment portion and facilitate engagement thereof with the corresponding forward support post.

3. The operator's cab of claim 2 wherein said obstructing dimension is less than the eye spacing of an operator positioned within said operator's station so that said forward support posts permit full vision at a given distance beyond said enclosure.

4. In an operator's cab for a crop harvesting machine said cab being mounted on said crop harvesting machine to provide a field of view of a portion of the harvesting operation involving the gathering of crop material from the field, said cab having a floor member; a roof member vertically spaced above said floor member; an operator's station supported on said floor member to position an operator's during operation of said crop harvesting machine; a plurality of generally vertically extending support posts supporting said roof member above said floor member, a portion of said support posts being positioned forwardly of said operator's station within said field of view, each said forward support post having an obstructing dimension extending generally perpendicular to the line of sight from said operator's station; an enclosure at least partially supported by said support posts, extending between said floor member and said roof member and surrounding said operator's station, said enclosure including transparent panels extending between said forward support posts; and glazing elements supported by said forward support posts to engage and support said transparent panels, the improvement comprising:

at least one of said forward support posts having an elongated cross-sectional configuration with a major dimension greater than a minor dimension, said at least one forward post being oriented with respect ot said operator's station such that said obstructing dimension is said minor dimension, at least one of said glazing elements being an elongated extrusion having an attachment portion engageable with the corresponding forward support post to effect attachment therewith and a panel support portion engageable with the said corresponding transparent panels for support and retention thereof, said extrusion being constructed such that said corresponding transparent panels are positonally fixed without any portion of said corresponding forward support post being positioned therebetween.

5. The operator's cab of claim 4 wherein said minor dimension is less than the eye spacing of an operator positioned within said operator's station so that said at least one forward support post permits full vision of said harvesting operation at a given distance beyond said enclosure.

6. The operator's cab of claim 5 wherein said obstructing dimension for each said forward support post is less than the eye spacing of said operator.

7. The operator's cab of claim 6 wherein each said glazing element has a dimension no greater than said obstructing dimension, each said glazing element being positioned on the opposing side of the corresponding said support post from said operator's station such that said glazing elements do not obstruct said field of view.

8. The operator's cab of claim 7 wherein said attachment portion of said extrusion has an opening extending axially therethrough to permit deformation of said attachment portion and facilitate engagement thereof with the corresponding forward support post.

9. The operator's cab of claim 8 wherein said attachment portion and said panel retention portion are integrally formed in said glazing extrusion.

10. The operator's cab of claim 8 wherein said forward supports posts are inclined in a forward direction relative to the direction of travel of said crop harvesting machine.

11. The operator's cab of claim 10 wherein at least one of said support posts forms a hollow conduit for the passage of wiring and hoses therethrough.

* * * * *